US009569002B2

(12) United States Patent
Walker

(10) Patent No.: US 9,569,002 B2
(45) Date of Patent: Feb. 14, 2017

(54) PORTABLE ELECTRONIC DEVICE HAVING A SENSOR ARRANGEMENT FOR GESTURE RECOGNITION

(75) Inventor: David Ryan Walker, Waterloo (CA)

(73) Assignee: BlackBerry Limited, Waterloo (CA)

(*) Notice: Subject to any disclaimer, the term of this patent is extended or adjusted under 35 U.S.C. 154(b) by 668 days.

(21) Appl. No.: 12/971,223

(22) Filed: Dec. 17, 2010

(65) Prior Publication Data

US 2012/0154288 A1 Jun. 21, 2012

(51) Int. Cl.
*G06F 3/02* (2006.01)
*G09G 5/00* (2006.01)
*G06F 3/01* (2006.01)
*G06F 1/16* (2006.01)
*G06F 3/0338* (2013.01)

(52) U.S. Cl.
CPC ............ *G06F 3/017* (2013.01); *G06F 1/1616* (2013.01); *G06F 1/1626* (2013.01); *G06F 1/1628* (2013.01); *G06F 1/1677* (2013.01); *G06F 1/1681* (2013.01); *G06F 1/1694* (2013.01); *G06F 3/0338* (2013.01)

(58) Field of Classification Search
CPC ........ G06F 3/02; G06F 1/1616; G06F 1/1626; G06F 1/1628; G06F 1/1677; G06F 1/1681; G06F 1/1694; G06F 3/017; G06F 3/0338; G09G 5/00
USPC .......................................... 345/156, 169, 173
See application file for complete search history.

(56) References Cited

U.S. PATENT DOCUMENTS

| 4,072,920 | A | * | 2/1978 | Wright ........................... 335/285 |
| 4,866,854 | A |   | 9/1989 | Seltzer |
| 5,325,869 | A |   | 7/1994 | Stokes |
| 5,734,130 | A |   | 3/1998 | Baker |
| 6,606,085 | B1 |  | 8/2003 | Endo et al. |
| 6,931,940 | B2 |  | 8/2005 | Baudendistel |
| 7,016,263 | B2 |  | 3/2006 | Gueissaz et al. |
| 7,239,898 | B2 | * | 7/2007 | Lenchik et al. ............ 455/575.1 |
| 7,257,430 | B2 | * | 8/2007 | Lenchik et al. ............ 455/575.3 |
| 7,326,869 | B2 |  | 2/2008 | Flynn et al. |
| 7,377,046 | B2 | * | 5/2008 | Yamada ........................... 33/356 |
| 7,456,823 | B2 | * | 11/2008 | Poupyrev et al. ............. 345/173 |
| 7,907,838 | B2 | * | 3/2011 | Nasiri et al. .................... 396/55 |
| 8,072,425 | B2 | * | 12/2011 | Takatsuka et al. ............ 345/160 |

(Continued)

FOREIGN PATENT DOCUMENTS

| EP | 1385081 A2 | 1/2004 |
| EP | 1750418 A2 | 2/2007 |

(Continued)

OTHER PUBLICATIONS

Jonathan Hook, Stuart Taylor, Alex Butler, Nicolas Villar, Shahram Izadi, A Reconfigurable Ferromagnetic Input Device, Association for Computing Machinery, Inc, Oct. 4, 2009.

(Continued)

*Primary Examiner* — Afroza Chowdhury
(74) *Attorney, Agent, or Firm* — Ridout & Maybee LLP

(57) ABSTRACT

The present disclosure provides a portable electronic device having a sensor arrangement for gesture recognition and a method for gesture recognition. In accordance with one example embodiment, the portable electronic device comprises: a processor; a flexible housing including a magnet; a magnetic sensor connected to the processor which monitors a magnetic field generated by the magnet.

19 Claims, 8 Drawing Sheets

(56) References Cited

U.S. PATENT DOCUMENTS

| | | | |
|---|---|---|---|
| 8,082,805 B2* | 12/2011 | Kisker | 73/862.333 |
| 8,486,833 B2* | 7/2013 | Bruzewicz et al. | 438/675 |
| 8,581,859 B2* | 11/2013 | Okumura et al. | 345/173 |
| 2004/0008191 A1* | 1/2004 | Poupyrev et al. | 345/184 |
| 2004/0080491 A1 | 4/2004 | Takatsuka et al. | |
| 2005/0077988 A1* | 4/2005 | Van Zeeland et al. | 335/205 |
| 2005/0264530 A1 | 12/2005 | Takatsuka et al. | |
| 2006/0133052 A1 | 6/2006 | Harmon et al. | |
| 2007/0056493 A1* | 3/2007 | Burkitt et al. | 112/429 |
| 2007/0091071 A1* | 4/2007 | Kimura et al. | 345/169 |
| 2007/0242887 A1* | 10/2007 | Matsushita et al. | 382/209 |
| 2008/0001830 A1 | 1/2008 | Hirai et al. | |
| 2008/0052933 A1* | 3/2008 | Yamada | 33/356 |
| 2008/0068337 A1 | 3/2008 | Yim et al. | |
| 2008/0172634 A1 | 7/2008 | Choi et al. | |
| 2008/0192005 A1* | 8/2008 | Elgoyhen et al. | 345/158 |
| 2008/0290858 A1 | 11/2008 | Guo et al. | |
| 2008/0291225 A1* | 11/2008 | Arneson | 345/698 |
| 2009/0021416 A1* | 1/2009 | Asaba | 342/4 |
| 2009/0134963 A1* | 5/2009 | Ogden et al. | 335/297 |
| 2009/0262074 A1* | 10/2009 | Nasiri et al. | 345/158 |
| 2009/0303204 A1* | 12/2009 | Nasiri et al. | 345/184 |
| 2010/0011291 A1* | 1/2010 | Nurmi | 715/702 |
| 2010/0013775 A1 | 1/2010 | Son | |
| 2010/0053301 A1* | 3/2010 | Ryu et al. | 348/14.02 |
| 2010/0079395 A1* | 4/2010 | Kim et al. | 345/173 |
| 2010/0197148 A1 | 8/2010 | Rudisill et al. | |
| 2010/0197355 A1 | 8/2010 | Irie et al. | |
| 2010/0214216 A1* | 8/2010 | Nasiri et al. | 345/158 |
| 2010/0282825 A1* | 11/2010 | Wang | 229/92.8 |
| 2010/0298032 A1* | 11/2010 | Lee et al. | 455/566 |
| 2010/0317409 A1* | 12/2010 | Jiang et al. | 455/566 |
| 2011/0045577 A1* | 2/2011 | Bruzewicz et al. | 435/287.1 |
| 2011/0095975 A1* | 4/2011 | Hwang et al. | 345/156 |
| 2011/0167391 A1* | 7/2011 | Momeyer et al. | 715/863 |
| 2011/0285647 A1* | 11/2011 | Imamura et al. | 345/173 |
| 2012/0038570 A1* | 2/2012 | Delaporte | 345/173 |
| 2012/0068942 A1* | 3/2012 | Lauder et al. | 345/173 |
| 2012/0127087 A1* | 5/2012 | Ma | 345/173 |
| 2012/0169609 A1* | 7/2012 | Britton | 345/173 |
| 2012/0260220 A1* | 10/2012 | Griffin | 715/863 |

FOREIGN PATENT DOCUMENTS

| | | | | |
|---|---|---|---|---|
| EP | 1867958 | * | 12/2007 | G06F 1/16 |
| EP | 2254314 A1 | | 11/2010 | |

OTHER PUBLICATIONS

Paul Miller, Synaptics Fuse concept handset puts a new squeeze on touchphone interaction, http://www.engadget.com/2009/12/14/synaptics-fuse-concept-handset-puts-a-new-squeeze-on-touchphone/, Dec. 14, 2009.

James Scott, Lorna M. Brown, and Mike Molloy, "Mobile Device Interaction with Force Sensing", Lecture Notes in Computer Science (LNCS) 5538, pp. 133-150, 2009.

James Scott, Lorna M Brown and Mike Molloy, "I Sense a Disturbance in the Force: Mobile Device Interaction with Force Sensing", MSR-TR-2008-57, 2008.

Unknown Author, Bendable, twistable phones, http://www.touchuserinterface.com/2009/04/bendable-twistable-phones.html, Apr. 27, 2009.

G. Herkenrath, T. Karrer, and J. Borchers, "Twend: twisting and bending as new interaction gesture in mobile devices," CHI 2008 proceedings; Apr. 2008.

G. Herkenrath, T. Karrer, and J. Borchers, "Twend: twisting and bending as new interaction gesture in mobile devices," http://www.hci.rwth-aachen.de/twentd; 2008.

Communication Pursuant to Article 94(3) EPC; EP 10 195 652.2; Feb. 8, 2013.

Partial European Search Report; EP 10195652.2; Dated May 24, 2011.

Extended European Search Report; EP No. 10195652.2; Sep. 20, 2011.

Office Action; Canadian Application No. 2,759,335; Dec. 30, 2014.

* cited by examiner

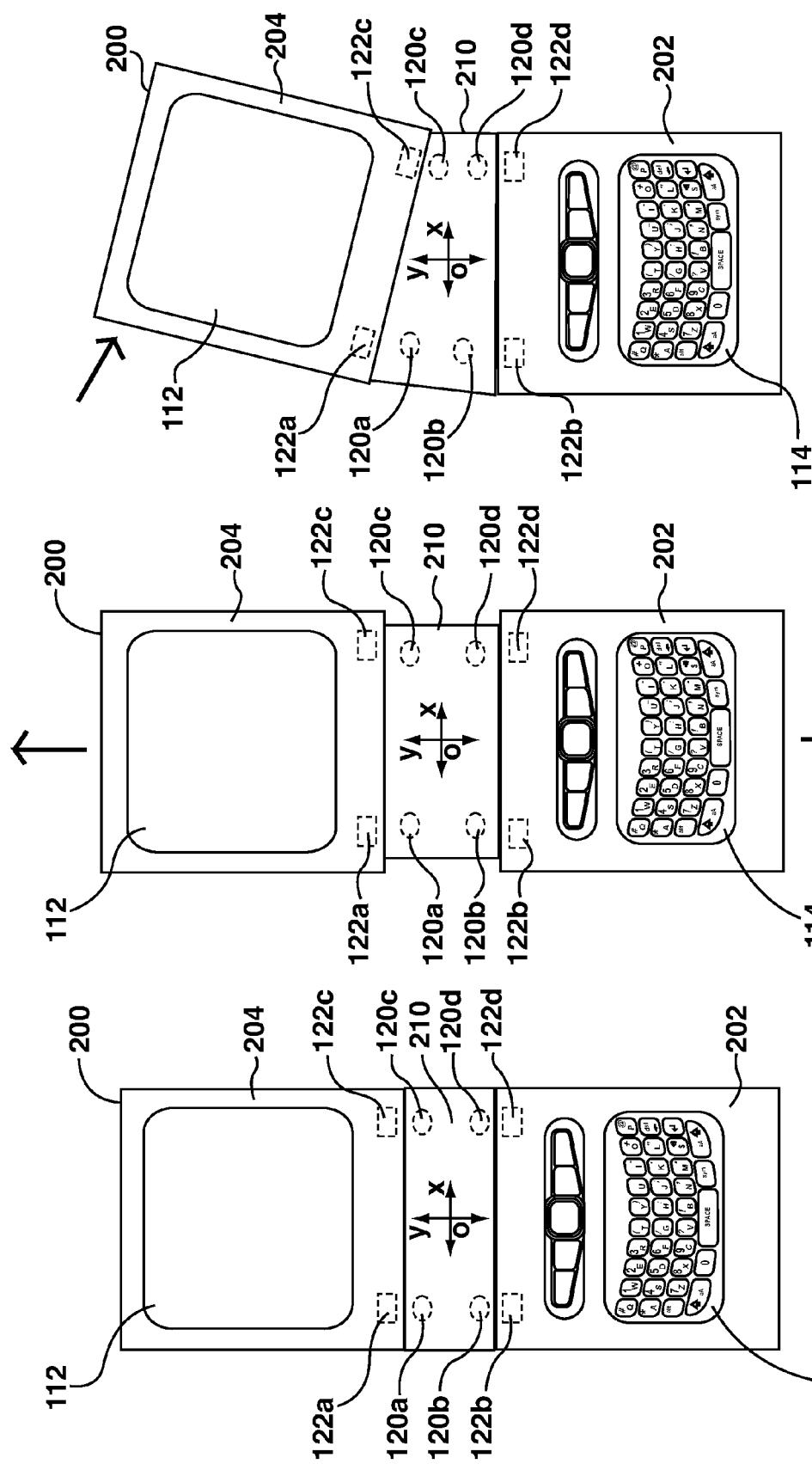

PORTABLE ELECTRONIC DEVICE HAVING A SENSOR ARRANGEMENT FOR GESTURE RECOGNITION

TECHNICAL FIELD

The present disclosure relates to portable electronic devices, and more particularly to a portable electronic device having a sensor arrangement for gesture recognition.

BACKGROUND

Electronic devices, including portable electronic devices, are increasingly being configured for gestural control as part of the movement towards ubiquitous computing in which devices are adapted for more natural and intuitive user interaction instead of requiring the user to adapt to the device. The majority of gestural controls are in the form of touch gestures detected with a touch-sensitive display or motion gestures detected with a motion sensor such as an accelerometer. Alternative forms of gestural control are desirable to provide a more natural and intuitive user interaction with an electronic device.

BRIEF DESCRIPTION OF THE DRAWINGS

FIG. 2A is a front view of a portable electronic device in accordance with one example embodiment in a fully opened position;

FIG. 2B is a front view of the portable electronic device of FIG. 2A in an extended position;

FIG. 2C is a front view of the portable electronic device of FIG. 2A in a rotated position;

DETAILED DESCRIPTION OF EXAMPLE EMBODIMENTS

Figure 1:
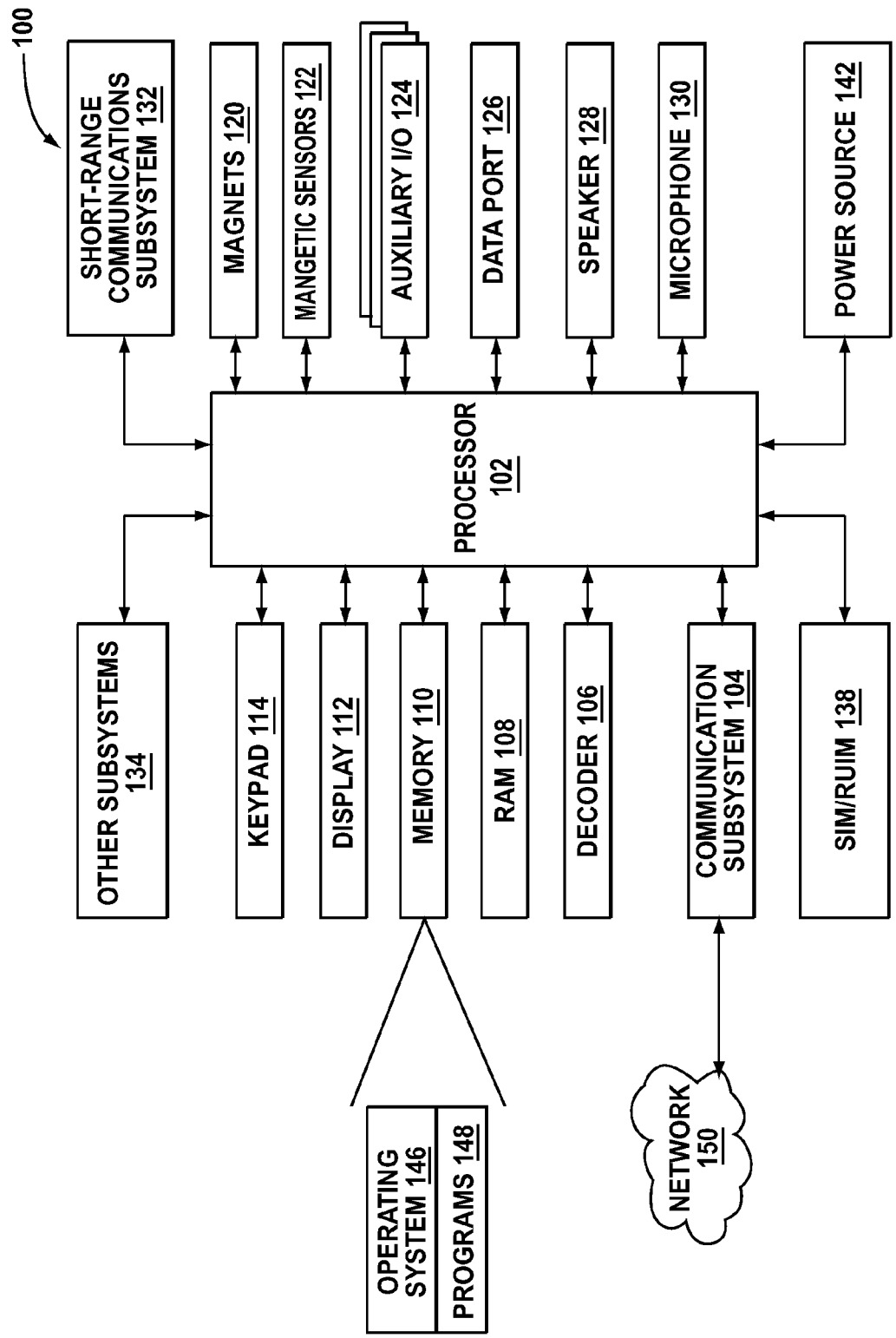
FIG. 1 is a simplified block diagram of components including internal components of a portable electronic device suitable for carrying out the example embodiments of the present disclosure.

Reference will now be made to the accompanying drawings which show, by way of example, example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein. Any reference to direction or orientation herein is for convenience and is not intended to be limiting unless explicitly stated herein.

The disclosure generally relates to a portable electronic device such as a handheld electronic device. Examples of handheld electronic devices include wireless communication devices such as, for example, pagers, mobile telephones, smartphones, tablet computing devices, wireless organizers, personal digital assistants (PDAs), and so forth. The portable electronic device may also be a handheld electronic device with or without wireless communication capabilities such as, for example, an electronic gaming device, digital photograph album, digital camera, or other device.

The present disclosure provides a solution which augments the traditional input devices with specific inputs or responses caused by stretching, bending, twisting, or squeezing the portable electronic device. Magnetic sensors are use to detect the movement of magnets when a flexible body of the portable electronic device is deformed by stretching, bending, twisting, or squeezing. The proposed solution offers a relatively inexpensive and simple solution for providing inputs which may be used to supplement or replace inputs from traditional input devices.

In accordance with one example embodiment, there is provided a method for gesture recognition on an electronic device, comprising: monitoring a magnetic field; identifying a change in the magnetic field which matches a predetermined gesture recognition criterion; and causing an action in correspondence with the predetermined gesture recognition criterion in response to the identifying.

In accordance with another example embodiment, there is provided a portable electronic device, comprising: a processor; a flexible housing including a magnet; a magnetic sensor connected to the processor which monitors a magnetic field generated by the magnet.

In accordance with a further embodiment of the present disclosure, there is provided a computer program product comprising a computer readable medium having stored thereon computer program instructions for implementing a method on an electronic device, the computer executable instructions comprising instructions for performing the method(s) set forth herein.

Reference is made to FIG. 1, which illustrates in block diagram form, a portable electronic device 100 to which example embodiments described in the present disclosure can be applied. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 (such as a liquid crystal display (LCD)), a keyboard 114, magnets 120, magnetic sensors 122, one or more auxiliary input/output (I/O) subsystems 124, a data port 126, a speaker 128, a microphone 130, a short-range communications subsystem 132, and other device subsystems 134. User-interaction with a graphical user interface (GUI) is performed using input devices, including the keyboard 114. The GUI displays user interface screens on the display 112 which display information such as text, characters, symbols, images, icons, and other items.

The keyboard 114 may be a reduced QWERTY or full QWERTY keyboard. Each key of the keyboard 114 may be associated with one or more indicia representing an alphabetic character, a numeral or a command (such as a space command, return command, or the like). A plurality of the keys having alphabetic characters may be arranged in a standard keyboard layout such as a QWERTY layout, a QZERTY layout, a QWERTZ layout, an AZERTY layout, a Dvorak layout, a Russian keyboard layout, a Chinese keyboard layout, or other suitable layout. These standard layouts are provided by way of example and other similar standard layouts may be used. The keyboard layout may be based on the geographical region in which the portable electronic device 100 is intended for use. In other embodiments, a keypad such as that defined international standard ITU E.161/ISO 9995-8 may be provided instead of the keyboard 114.

The magnets 120 may be any suitable type of permanent magnet such as, for example, a ceramic or ferrite magnet. The magnets 120 are located in the housing of the portable electronic device 100 as described in more detail below and generate a magnetic field. The magnetic sensors 122 are magnetometers which sense and measure the strength and/or direction of the magnetic field caused by the magnets 120. In the shown examples, the magnetic sensors 122 are Hall Effect sensors but may be semiconductor magnetoresistive elements, ferro-magnetic magnetoresistive elements or Giant magnetoresistance (GMR) devices in other embodiments.

Each Hall Effect sensor 122 comprises a sensor element (not shown) connected to a differential amplifier (not shown). The Hall Effect sensor element is made of semiconductor material, such as silicon, and has a flat rectangular shape. A Hall Effect sensor element is actuated by applying power to its longitudinal ends so that current flows longitudinally through the sensor element. The longitudinal ends of Hall Effect sensor element are respectively connected to a regulated voltage source (V) and to a ground (not shown). When current flows longitudinally through the Hall Effect sensor element, a voltage differential is created across the element at its output(s) when a magnetic flux of proper polarity passes perpendicularly through the plane of the Hall Effect sensor element. The magnitude of the voltage created is proportional to the magnetic flux density of the vertical component of the field.

The differential amplifier is connected in parallel to the voltage source (V) and the ground. The differential amplifier amplifies the voltage output of the Hall Effect sensor element to produce an amplified output which is proportional to the magnetic flux density passing through the Hall Effect sensor element. The output of the differential amplifier is a signal proportional to magnetic flux density being received by the Hall Effect sensor element.

The shape, orientation and polarity of each magnet 120 and the magnetic field generated therefrom can vary from a very narrow field which can actuate only one Hall Effect sensor 122 at a time to a wide field which can actuate a number of Hall Effect sensors 122 simultaneously. Each Hall Effect sensor 122 may be paired with a particular magnet or magnets 120 by appropriate selection of the shape, orientation and/or polarity of the particular magnet 120. This allows a particular Hall Effect sensor 122 to sense the proximity of a particular magnet 120 in the group of magnets 120. The position of the particular magnet 120 can be determined, for example, using the processor 102 from the voltage output of the paired Hall Effect sensor 122.

The portable electronic device 100 may also include a navigation device (not shown), one or more control keys or buttons (not shown), an accelerometer (not shown) which detects gravitational forces or gravity-induced reaction forces, an orientation sensor (not shown), or any combination thereof. The display 112 may be part of a touch-sensitive display comprising a touch-sensitive overlay (not shown) which overlays the display 112 and is coupled to an electronic controller (not shown). The keyboard 114 may be omitted in some embodiments such as, for example, when a touch-sensitive display is provided by the portable electronic device 100. The navigation device may be, for example, a depressible (or clickable) joystick such as a depressible optical joystick, a depressible trackball, a depressible scroll wheel, or a depressible touch-sensitive trackpad or touchpad.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146, software applications (or programs) 148 that are executed by the processor 102, and data which are typically stored in a persistent, updatable store such as the memory 110. Additional applications or programs 148 may be loaded onto the portable electronic device 100 through the wireless network 150, the auxiliary I/O subsystem 124, the data port 126, and the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data objects, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2D:
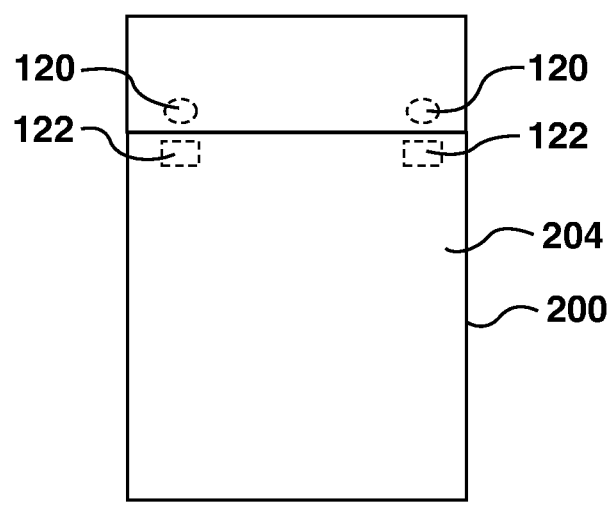
FIG. 2D is a front view of the portable electronic device of FIG. 2A in a fully closed position.
Figure 3:
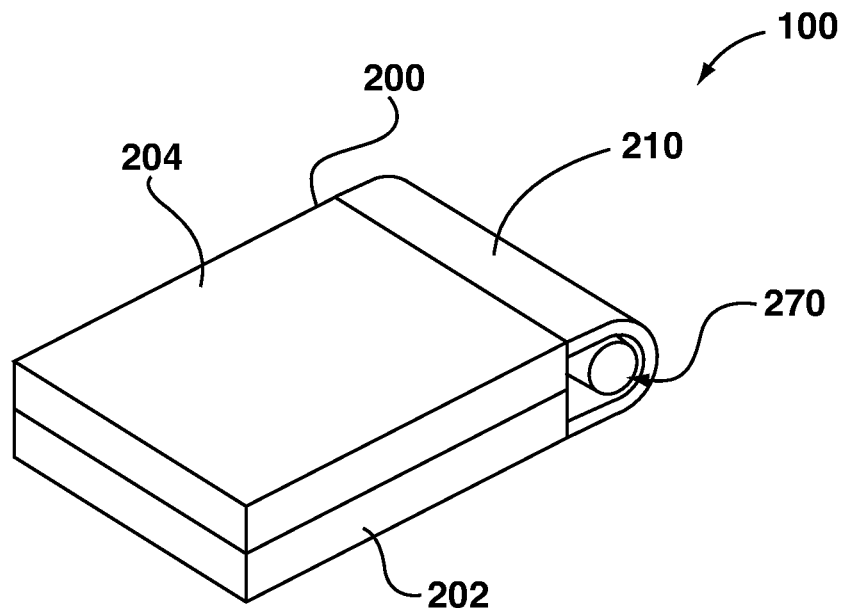
FIG. 3 is a perspective view of the portable electronic device of FIG. 2A.
Figure 4:
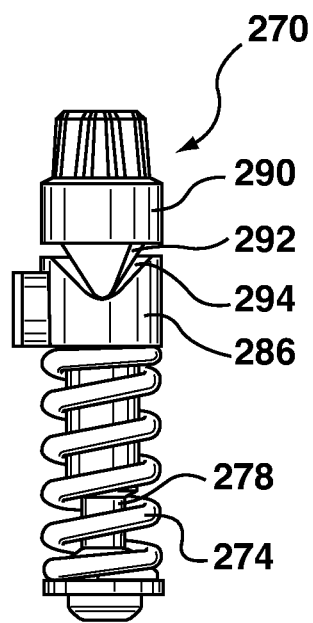
FIG. 4 shows an axial hinge pin assembly of an example embodiment of a biasing mechanism of the portable electronic device of FIG. 2A.

FIGS. 2A to 2D illustrate front views of an example of a portable electronic device 100 in portrait orientation in accordance with one embodiment of the present disclosure. FIG. 3 illustrates a perspective view of the portable electronic device 100. In FIG. 2A, the portable electronic device 100 is in a fully opened position. The fully opened position acts as a reference position for other device positions for gesture recognition, as described below. In FIG. 2B, the portable electronic device 100 is in an extended position relative to the fully opened position. In FIG. 2C, the portable electronic device 100 is in a rotated position relative to the fully opened position. In FIGS. 2D and 3, the portable electronic device 100 is in a fully closed position. In the example embodiment shown in FIGS. 2A to 2D, the portable electronic device 100 is a flip or clamshell type device. In other example embodiments, the portable electronic device 100 is a slider type device.

The portable electronic device 100 includes a housing 200 that houses internal components including internal components shown in FIG. 1. The housing 200 frames the touch-sensitive display 118 such that the touch-sensitive display 118 is exposed for user interaction when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The housing 200 includes a lower body (casing) 202 and an upper body (casing) 204 connected by a flexible hinge 210. The flexible hinge 210 may be constructed from any suitable material including, but not limited to, a suitable urethane, neoprene, silicone rubber or other suitable flexible material. Each of the lower body 202 and upper body 204 is moveable relative to the other to open and close the portable electronic device 100. The flexible hinge 210 permits rotational movement of the bodies relative to each other about the flexible hinge 210 within a range between a fully opened position (FIG. 2A) and fully closed position (FIG. 2D). The portable electronic device 100 is in the fully closed position when the lower body 202 is brought together to rest against the upper body 204. When the portable electronic device 100 is in the other terminal position (the fully opened position) the lower body 202 will be at least at an obtuse angle in relation to the upper body 204. The distance at which the lower body 202 will open away from the upper body 204 will vary between embodiments. In the shown example of FIG. 2A, the lower body 202 is located at about a 180 degree angle in relation to the upper body 204.

In the shown example, the upper body 204 houses the display 112 and the speaker 128 while the lower body houses the keyboard 114 and microphone 130. Typically, the lower body 202 and upper body 204 each include a circuit board (not shown) which, for example, may be a rigid printed circuit board (PCB) or a flexible PCB. The processor 102 is typically attached to a main, rigid PCB in the lower body 202 or upper body 204 along with the remainder of the electronic circuitry. Typically, the main PCB and processor 102 are located in the lower body 202 along with the remainder of the electronic circuitry.

The components housed within or carried by each of the bodies 202, 204 may vary between embodiments. A flexible PCB may connect components in the lower body 202 and upper body 204. The flexible PCB may be provided within the flexible hinge 210. Alternatively, a short-range wireless communication protocol, such as Bluetooth™, may be used for communication between components in the lower body 202 and upper body 204. The use of a short-range wireless communication protocol rather than a flexible PCB provides more flexibility in the hinge design. The use of a short-range wireless communication protocol may require a battery (or suitable power source) in both halves of the portable electronic device 100, depending on the short-range wireless communication protocol used. When the portable electronic device 100 is closed, the inner face of the upper body 204 at least substantially covers the inner face of the lower body 202, and likewise the inner face of the lower body 202 at least substantially covers the inner face of the upper body 204. Conversely, when the portable electronic device 100 is opened, the previously covered faces are exposed.

The portable electronic device 100 may be provided with an unlock button (not shown) on an outer surface of the portable electronic device 100 which releases a latch (not shown) for holding the lower body 202 and upper body 204 in the fully closed position. The unlock button is located on one of the lower body 202 and upper body 204 and the latch is located on the other of the lower body 202 and upper body 204. When the portable electronic device 100 is closed, the latch engages an opening in the housing 200 or a component on the portable electronic device 100.

Four magnets 120, represented individually by references 120a, 120b, 120c and 120d, are located on, or in, the flexible hinge 210. The magnets 120 may be exposed and visible to the user or embedded within the flexible hinge 210 such that the magnets 120 are not visible to the user, depending on the embodiment. When the portable electronic device 100 is in the fully opened position, the flexible hinge 210 is substantially flat as shown in FIG. 2A to 2C. In the shown example, the magnets 120 are located in accordance with a coordinate system defined by an x-axis and y-axis of an x-y plane. The origin (O) of the x-y plane is located in the centre of the flexible hinge 210 in the shown example but may be located elsewhere in other embodiments.

The magnets 120 are symmetrically located in the plane with respect to the origin such that an array or grid of magnets 120 is formed. The first magnet 120a is located at a position (-x, y) located towards the left side of the portable electronic device 100 and towards the upper body 204. The second magnet 120b is located at a position (-x, -y) located towards the left side of the portable electronic device 100 and towards the lower body 202. The third magnet 120c is located at a position (x, y) located towards the right side of the portable electronic device 100 and towards the upper body 204. A fourth magnet 120d is located at a position (x, -y) located towards the right side of the portable electronic device 100 and towards the lower body 202. The magnets 120 are spaced apart and inset slightly from the respective edges of the flexible hinge 210.

A different number of magnets 120 and a different location for the magnets 120 may be used in other embodiments. Similarly, a different number of Hall Effect sensors 122 may be used in other embodiments, for example, more than one Hall Effect sensor 122 may be provided for each magnet 120 in other embodiments to increase the precision with which the movement of the magnets 120 can be sensed. Thus, two or more magnets 120 may be used with a single Hall Effect sensor 122 or two or more Hall Effect sensors 122 may be used with a single magnet 120 in other embodiments. The accuracy of position sensing varies with the number of magnetic sensors 122 used to sense each magnet 120 and the number of magnets sensed by each magnetic sensor 122.

In the shown example, four Hall Effect sensors 122 are provided such that there is a Hall Effect sensor for each of the magnets 120. The Hall Effect sensors 122 are located in the flexible hinge 210 of the portable electronic device 100. In the shown example, the four Hall Effect sensors 122 are symmetrically located in the same plane as the magnets 120. The Hall Effect sensors 122 are located symmetrically with respect to the origin such that an array or grid of Hall Effect sensors 122 is formed.

The first Hall Effect sensor 122a is located at a position (-x2, y2) located in the upper body 204 towards the left side of the portable electronic device 100. The second Hall Effect sensor 122b is located at a position (-x2, -y2) located in the lower body 202 and towards the left side of the portable electronic device 100. The third Hall Effect sensor 122c is located at a position (x2, y2) in the upper body 204 and towards the right side of the portable electronic device 100. A fourth Hall Effect sensor 122d is located at a position (x2, −y2) in the lower body 202 and towards the right side of the portable electronic device 100. The Hall Effect sensors 122 are spaced apart and inset slightly from the respectively edges of the housing 200. The four Hall Effect sensors 122 are attached to the circuit boards (e.g., PCB) of the lower body 202 and upper body 204 in the shown example, with two Hall Effect sensors 122 in the lower body 202 and two Hall Effect sensors 122 in the upper body 204. The PCBs of the lower body 202 and upper body 204 are attached by the flexible PCB described above. Alternatively, the Hall Effect sensors 122 may be all located in the circuit board of one of the lower body 202 and upper body 204, such as, for example the main PCB. Alternatively, the Hall Effect sensors 122 may be located in a flexible PCB connecting the circuit boards of the lower body 202 and upper body 204.

In at least some embodiments, each Hall Effect sensor 122 is adapted (e.g., "paired") to sense the particular magnet or magnets in the plurality of magnets 120 by appropriate selection of the shape, orientation and/or polarity of the particular magnet or magnets. This allows a particular Hall Effect sensor 122 to sense the proximity of a particular magnet or magnets 120 in the plurality of magnets 120. The position of the particular magnet 120 can be determined, for example, using the processor 102 from the voltage output of the paired Hall Effect sensor 122. As noted above, two or more magnets 120 may be used with a single Hall Effect sensor 122 or multiple Hall Effect sensors 122 may be used with a single magnet 120. Two or more magnets 120 may be used with a single Hall Effect sensor 122 to identify specific events, e.g. gestures. Multiple magnetic sensors for a single magnet 120 may make it easier (and more accurate) to identify the position and/or motion of the particular magnet 120. Three magnetic sensors surrounding a magnet 120 may potentially identify the location of the magnet 120 in a 3D-space.

The magnet 120 and Hall Effect sensor 122 in each magnet-sensor pair are located proximate to each other. In the shown example, the first magnet 120a is paired with the first Hall Effect sensor 122a, the second magnet 120b is paired with the second Hall Effect sensor 122b, the third magnet 120c is paired with the third Hall Effect sensor 122c, and the fourth magnet 120d is paired with the fourth Hall Effect sensor 122d.

In the shown example, the magnet 120 and Hall Effect sensor 122 in each magnet-sensor pair are vertically offset from each other along the y-axis but aligned with respect to the x-axis. In other embodiments, the magnet 120 and Hall Effect sensor 122 in each magnet-sensor pair may be horizontally offset from each other along the x-axis but aligned with respect to the y-axis. A different configuration of the magnets 120 and Hall Effect sensors 122 may be used in other embodiments.

The flexible hinge 120 allows the portable electronic device 100 to be stretched, twisted or otherwise moved from the fully opened position (FIG. 2A) to other device positions including, but not limited to, an extended position caused by stretching the portable electronic device 100 vertically (FIG. 2B) or a rotated position caused by bending or twisting of the portable electronic device 100 (FIG. 2C)—vertical and horizontal movement of one of the lower body 202 and upper body 204 relative to the other. The flexible hinge 120 permits stretching movement of the lower body 202 and the upper body 204 relative to each other between at least the fully opened position and the extended position relative to the fully opened position. The flexible hinge 120 also permits bending movement of the lower body and the upper body relative to each other between at least the fully opened position and a rotated position relative to the fully opened position.

These movements cause the magnets 120 to move relative reference positions in fully opened position. The magnets 120 may move away from or toward the Hall Effect sensors 122, depending on the type of movement. The vertical stretching movement of FIG. 2B causes the magnets 120 to move away from the Hall Effect sensors 122, whereas the twisting movement of FIG. 2C causes some magnets 120 to move away from the Hall Effect sensors 122 and some magnets to move towards the Hall Effect sensors 122. The movement of the magnets 120 cause changes in the magnetic field which are sensed by the Hall Effect sensors 122. The changes in the magnetic field result in changes in the output voltages of the Hall Effect sensors 122. The output voltages represent magnetic flux density sensed by the Hall Effect sensors 122.

The output of the Hall Effect sensors 122 is sent to an analog-to-digital converter (ADC) which converts the analog values of the Hall Effect sensors to digital values. The ADC outputs the digital values to the processor 102 for analysis. The ADC may be part of the sensors in some embodiments. Alternatively, the output voltages of the Hall Effect sensors 122 may be sent to and analysed by a dedicated position controller (not shown). The relationship between the magnetic flux density sensed by a Hall Effect sensor 122 relative to the position of the magnet(s) 120 sensed by the Hall Effect sensor 122 is stored on the portable electronic device 100, for example in memory 110 or in an internal memory of the position controller. The relationship may be defined, for example, by a formula or by empirical data in a table.

The processor 102 compares magnetic flux density data output from the Hall Effect sensors 122 to one or more predetermined gesture recognition criteria to determine whether the movement of the magnets 120 corresponds to a known gesture including, but not limited to, a stretch gesture, bend gesture, twist gesture, squeeze gesture, or a positional gesture in which the portable electronic device 100 is changed from one device position to another device position. The predetermined gesture recognition may be any other suitable criteria. In some embodiments, the processor 102, dedicated position controller (not shown), converts magnetic flux density data output from the Hall Effect sensors 122 to a directional vector representation of the movement of the magnets 120 defined in terms of x and y coordinate values using the relationship between the magnetic flux density and magnet position. The directional vector representation is then compared to predetermined directional vectors representing a gesture to determine whether the movement of the magnets 120 corresponds to a known gesture. The gesture is identified when the determined directional vector matches the predetermined directional vector.

The predetermined gesture recognition criteria are used to identify (or recognize) a number of predetermined gestures each having at least one distinct gesture recognition criterion. For example, the determined directional vector representation may need to be within a threshold level of similarity to the reference vector representation of a particular gesture to be determined to correspond to that particular gesture. The gesture recognition criteria may be stored on the portable electronic device 100, for example in memory 110 or in an internal memory of the position controller.

The output of the Hall Effect sensors 122 may be sent to a comparator circuit (not shown) before being sent to the ADC or dedicated position controller. The comparator circuit determines whether the output voltage (e.g., representing the strength of the magnetic field) exceeds a threshold value. The threshold value may be set to correspond to a significant or notable amount of movement of the magnet 120. When the threshold is exceeded, the magnetic flux density data output from the Hall Effect sensors 122 is sent to the ADC followed by the processor 102, or dedicated position controller, for analysis. The comparator circuit reduces the processing required by the portable electronic device 100 by limiting the data which is analysed to data which represents a significant or notable movement of the portable electronic device 100.

When the movement of the magnets 120 corresponds to a known (e.g., recognized) gesture, the processor 102 interprets the change in magnetic field as an input event in analogous fashion to the detection of a touch gesture sensed by a touch-sensitive display or a motion gesture sensed by an accelerometer or other motion sensor. Each gesture may be associated with (e.g., mapped to) a designated action in correspondence with the gesture. The action may comprise a designated input action and/or output action. The processor 102, in response to a determined gesture, causes the designated action to be performed.

The designated action may comprise inputting a designated input character or command, which may vary depending on the active application (if any) and context-sensitive information. The designated action may further comprise outputting a result to an output device, such as the display 112, such as the input character or visual representation associated with the command. The context-sensitive information may include, but is not limited to, device state, currently displayed information and/or any currently selected information when the gesture was sensed, among other factors. The processor 102 may send a notification that the gesture has occurred to the operating system 146 or active application 148 in response to the input event. The operating system 146 or active application 148 may then determine the appropriate input or output in correspondence with the gesture.

The portable electronic device 100 may, in at least some example embodiments, include a biasing mechanism which cooperates with the flexible hinge 210. The biasing mechanism is configured to both urge the folding bodies 202, 204 to the fully closed position within a certain range of rotation (e.g., to complete a user-initiated closing of the portable electronic device 100), and urge the folding bodies 202, 204 to the fully opened position within another range of rotation (e.g., to complete a user-initiated opening of the portable electronic device 100. FIG. 3 illustrates one embodiment of a biasing hinge pin assembly 270 for providing a biasing mechanism. The biasing hinge pin assembly 270 is shown separate from the flexible hinge 210 and the remainder of the portable electronic device 100 in FIG. 3 to avoid obscuring the other features of the present disclosure. Different biasing mechanisms may be used in other embodiments.

The biasing hinge pin assembly 270 includes a coil spring 274 mounted on a shaft 278 applying bias pressure to a cam 286 that is fixed relative to the lower body 202. The hinge pin assembly 270 also includes cam follower 290 at an end of the shaft 278 that is fixed relative to the upper body 204. In other embodiments, the cam 286 may be fixed relative to the upper body 204 and the cam follower 290 may be fixed relative to the lower body 202.

Engagement surfaces 292 and 294 of the cam follower and cam 290 and 286 respectively are ramped so that the cam 286 will compress the spring 274 as the cam follower 290 is rotated out of the illustrated trough position. When the cam follower 290 is moved out of the trough position, the spring 274 will act to resist compression and urge the cam follower 290 back into the original trough position or into a second trough position if the cam follower 290 has been rotated past a peak position where the spring 274 is at its most compressed. It will be understood that there will be an increase in potential energy stored in the spring 274 if a force acts against and in excess of the spring's biasing force to deform (compress) the spring 274 in the process of causing the cam follower 290 to move along the ramped surface 294 of the cam 286. The force acting against the biasing force is supplied by torque applied to the bodies 204, 204 by the user. When moving the upper body 204 from either the fully open position to the fully closed position, or vice versa, the user applies sufficient torque to get the spring 274 past it maximum level of compression (where stored energy is at its maximum)-beyond that point, the spring then releases its energy and cooperates to move the upper body 204 to the desired position.

The flexible hinge 210 may not be involved in the rotation or movement of the lower and upper bodies 202, 204 between the fully opened and fully closed positions in some embodiments. In such embodiments, the flexible hinge 210 acts as a flexible skin or sheath used in gesture recognition while another rotatory mechanism, such as the biasing hinge pin assembly 270 or biasing mechanism is responsible for the movement of the portable electronic device 100 between the fully opened and fully closed positions.

Figure 7:
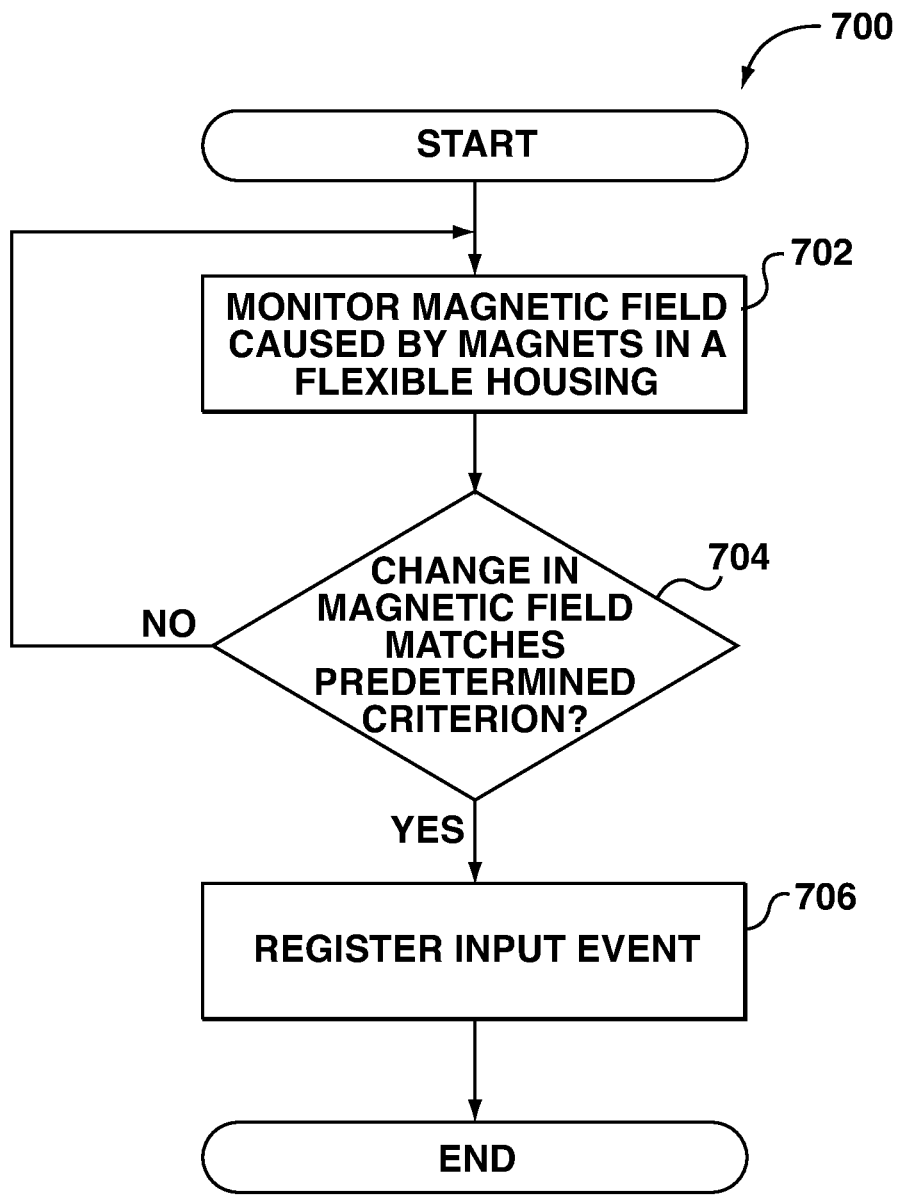
FIG. 7 is a flowchart illustrating an example method for gesture recognition on an electronic device in accordance with one example embodiment of the present disclosure.

A flowchart illustrating one example embodiment of a method 700 for gesture recognition on an electronic device is shown in FIG. 7. The method may be performed on the portable electronic device of FIGS. 2A to 4 or similarly equipped electronic device. The method 700 may be carried out, at least in part, by software executed by the processor 102. Coding of software for carrying out such a method 700 is within the scope of a person of ordinary skill in the art provided the present disclosure. The method 700 may contain additional or fewer processes than shown and/or described, and may be performed in a different order. Computer-readable code executable by at least one processor 102 of the portable electronic device 100 to perform the method 700 may be stored in a computer-readable medium such as the memory 110.

The processor 102 monitors a magnetic field caused by one or more magnets in a flexible hinge 210 or other flexible housing of the electronic device using one or more magnetic sensors 122 such as a Hall Effect sensor (702) as described above.

The processor 102 determines changes in the magnetic field and identifies when a change in the magnetic field matches gesture recognition criterion/criteria representing a known gesture (704). The gesture may be one of a number of known gestures each having a distinct gesture recognition criterion/criteria. The processor 102 interprets a change in the magnetic field which matches a gesture recognition criterion representing a known gesture as an input event and processes (e.g., registers) the input event accordingly (706). The gesture recognition criterion may be that the magnetic field detected by the magnetic sensor 122 exceeds a threshold value.

The processor 102 then causes an appropriate action to taken in correspondence with the input event. The action may comprise an input action and/or output action. The processor 102, in response to detecting a gesture, causes a designated action to be performed. The designated action may comprise inputting a designated input character or command, which may vary depending on the active application (if any) and context-sensitive information. The designated action may further comprise outputting a result to an output device, such as the display 112, such as the input character or visual representation associated with the command.

Figure 5:
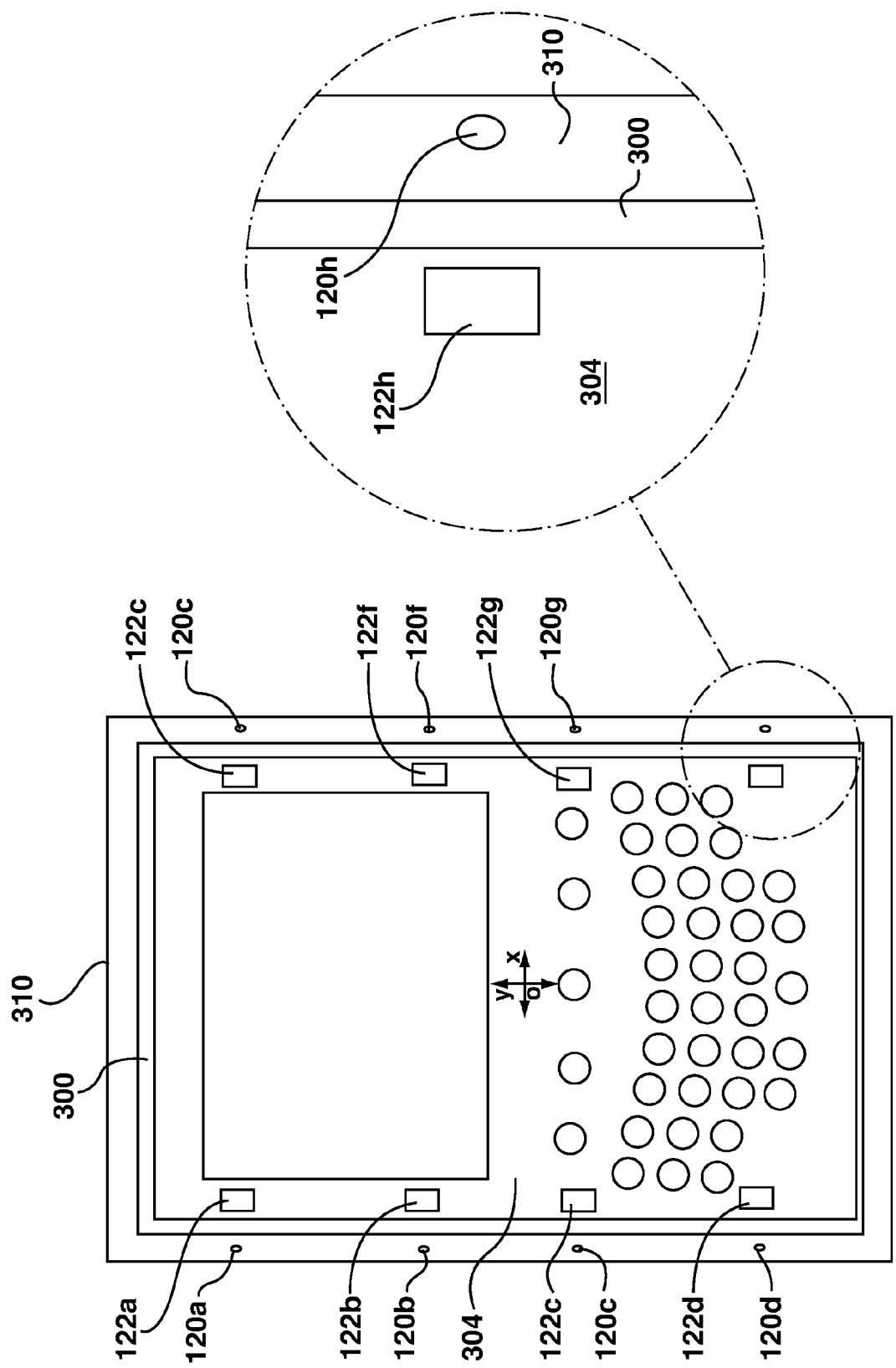
FIG. 5 is a plan sectional view of a portable electronic device in accordance with a second example embodiment with a flexible outer skin in a reference state.
Figure 6:
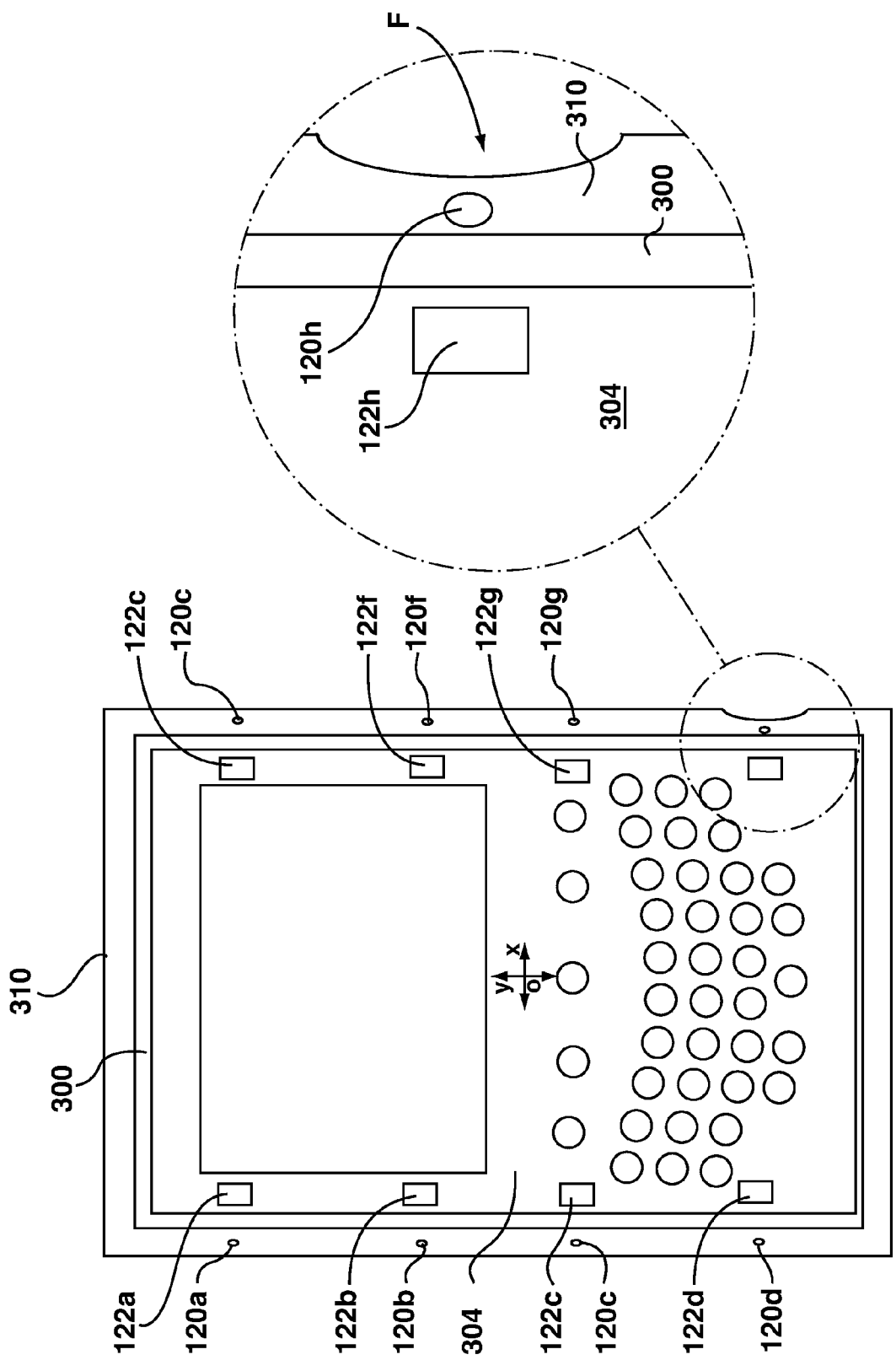
FIG. 6 is a plan sectional of the portable electronic device of FIG. 5 in the flexible outer skin in a compressed state.

Referring now to FIGS. 5 and 6, an example of a portable electronic device 100 in portrait orientation in accordance with another embodiment of the present disclosure will be described. FIG. 5 is a plan sectional view of the portable electronic device 100 with a flexible outer skin 310 in a reference state. The reference state is used for gesture recognition, as described below. FIG. 6 is a plan sectional view of the portable electronic device 100 with the flexible outer skin 310 in a compressed state. Unlike the above described examples which are directed to flip or slider type devices, the portable electronic device 100 shown in FIGS. 5 and 6 is a bar or brick type device.

The portable electronic device 100 includes a rigid housing 300 surrounded by a flexible skin 310 which fits substantially snug against the rigid housing 300. The flexible skin 310 may be constructed from any suitable material including, but not limited to, a suitable urethane, neoprene, silicone rubber or other suitable flexible material. The flexible skin 310 may be permanently affixed to the rigid housing 300 using a suitable adhesive or other suitable fastening means, or may be removable since the magnets 120 carried by the flexible skin 310 are passive elements. This permits a variety of different flexible skin 310 to be used. For example, some flexible skins 310 may vary the number of magnets 120, the size of the magnet sizes and/or the location of the magnets. This allows different gestures to be recognized by different skins. When a Hall Effect sensor 122 is paired with a particular magnet 120, omission of a magnet 120 effectively disables the Hall Effect sensor 122 paired with the omitted magnet 120 and the auxiliary input associated with the Hall Effect sensor 122. Thus, the functionality of the portable electronic device 100 may be controlled by changing the flexible skin 310.

The flexible skin 310 is compliant and resiliently compressible so that it may be locally compressed/deformed (FIG. 6) from a reference (or normal) state to a compressed state in response to a compressive force (F) caused, for example, by a user squeezing the portable electronic device 100, and return from the compressed state to the reference state (FIG. 5) when the compressive force (F) is removed. The magnets 120 are embedded in the flexible skin 310 so as to move in response to changes between the reference state and the compressed state as described below.

Eight magnets 120, represented individually by references 120a, 120b . . . 120h, are located in the flexible skin 310 at the edge of the portable electronic device 100. The magnets 120 may be exposed and visible to the user or embedded within the flexible skin 310 such that the magnets 120 are not visible to the user, depending on the embodiment. In the shown example, the magnets 120 are located in accordance with a coordinate system defined by an x-axis and y-axis of an x-y plane. The origin (O) of the x-y plane is located in the centre of the rigid housing 300 and the printed circuit board (PCB) 304 in the shown embodiments, but may be located elsewhere in other embodiments.

The magnets 120 are symmetrically located in the plane with respect to the origin such that an array or grid of magnets 120 is formed. Four magnets 120a, 120b, 120c and 120d are located in the left side of the flexible skin 310 at positions (−x, y2), (−x, y1), (−x, −y1), (−x, −y2). Four magnets 120e, 120f, 120g and 120h are located in the right side of the flexible skin 310 at positions (x, y2), (x, y1), (x, −y1), (x, −y2).

A different number of magnets 120 and a different location for the magnets 120 may be used in other embodiments. Similarly, a different number of Hall Effect sensors 122 may be used in other embodiments, for example, more than one Hall Effect sensor 122 may be provided for each magnet 120 in other embodiments to increase the precision with which the movement of the magnets 120 can be sensed. Thus, two or more magnets 120 may be used with a single Hall Effect sensor 122 or two or more Hall Effect sensors 122 may be used with a single magnet 120 in other embodiments. The accuracy of position sensing varies with the number of magnetic sensors 122 used to sense each magnet 120 and the number of magnets sensed by each magnetic sensor 122.

In the shown example, eight Hall Effect sensors 122 are provided so that there is a Hall Effect sensor for each of the magnets 120. The Hall Effect sensors 122 are located on the PCB 304 of the portable electronic device 100. In the shown example, the eight Hall Effect sensors 122 are symmetrically located in the same plane as the magnets 120. The Hall Effect sensors 122 are located symmetrically with respect to the origin such that an array or grid of Hall Effect sensors 122 is formed.

Four Hall Effect sensors 122a, 122b, 122c and 122d are located towards the left side of the rigid housing 300 at positions (−x2, y2), (−x2, y1), (−x2, −y1), (−x2, −y2). Four Hall Effect sensors 122e, 122f, 122g and 122h are located towards the right side of the rigid housing 300 at positions (x2, y2), (x2, y1), (x2, −y1), (x2, −y2).

A different number of magnets 120 and a different location for the magnets 120 may be used in other embodiments. For example, a single magnet may be used in the other embodiments.

In the shown example, the magnet 120 and Hall Effect sensor 122 in each magnet-sensor pair are horizontally offset from each other along the x-axis but aligned with respect to the x-axis. A different configuration of the magnets 120 and Hall Effect sensors 122 may be used in other embodiments.

Each Hall Effect sensor 122 is paired with a particular magnet 120 in accordance with the shape, orientation and/or polarity of the particular magnet 120. The magnet 120 and Hall Effect sensor 122 in each magnet-sensor pair are located proximate to each other. In the shown example, the first magnet 120a is paired with the first Hall Effect sensor 122a, the second magnet 120b is paired with the second Hall Effect sensor 122b, the third magnet 120c is paired with the third Hall Effect sensor 122c, and the fourth magnet 120d is paired with the fourth Hall Effect sensor 122d. Similarly, the fifth magnet 120e is paired with the fifth Hall Effect sensor 122e, the sixth magnet 122f is paired with the sixth Hall Effect sensor 122f, the seventh magnet 120g is paired with the seventh Hall Effect sensor 122g, and the eighth magnet 120h is paired with the eighth Hall Effect sensor 122h.

The flexible skin 310 allows the portable electronic device 100 to be compressed or squeezed such that local deformation is caused in the flexible skin 310. This causes the flexible skin 310 to change from its (normal) reference state (FIG. 5) to a compressed state (FIG. 6). Compression of the flexible skin 310 causes the magnet(s) 120 closest to the compression force (F) to move relative reference positions in reference state. The magnets 120 move towards the Hall Effect sensors 122 in response to the compression force. The movement of the magnet(s) 120 causes a change in the magnetic field sensed by the paired Hall Effect sensors 122. The changes in the magnetic field result in changes in the output voltages of the Hall Effect sensors 122. The output voltages represent magnetic flux density sensed by the Hall Effect sensors 122.

The output of the Hall Effect sensors 122 may be sent to a comparator circuit (not shown) which determines whether the output voltage (e.g., representing the strength of the magnetic field typically in terms of magnetic flux density) exceeds a threshold value. The threshold value may be set to correspond to a particular level of compression and local deformation of the flexible skin 310 so as to simulate the depression of a key or button. The threshold is typically the same for each Hall Effect sensor 122 but may vary between the Hall Effect sensors 122. A Hall Effect sensor 122 is actuated when its output value exceeds the threshold value.

When a Hall Effect sensor 122 is actuated, i.e., when it output voltage exceeds the threshold value, an interrupt is sent by the comparator circuit to the processor 102 on a designated interrupt port. The processor 102 uses the interrupt to determine that the flexible skin 310 has been compressed or squeezed at a particular Hall Effect sensor 122. The comparator circuit may also send the output voltage to an ADC which converts the analog values of the Hall Effect sensors 122 to digital values and outputs the digital values to the processor 102 for further analysis and processing. Alternatively, the comparator circuit may be omitted output voltages of the Hall Effect sensors 122 may be sent directly to the ADC which converts the analog values of the Hall Effect sensors 122 to digital values and outputs the digital values to the processor 102 which performs the threshold comparison.

The processor 102 interprets individual Hall Effect sensor actuations as individual input events conceptually similar to individual key presses of keyboard or individual button presses in the conventional fashion. Each Hall Effect sensor may be associated with (e.g., mapped) to a designated action. The action may comprise a designated input action and/or output action. The processor 102, in response to a determined gesture, causes the designated action to be performed. Actuation of a particular Hall Effect sensor causes its designated action to be performed. Simultaneous actuation of two or more Hall Effect sensors may be interpreted in a manner conceptually similar to simultaneous key presses or simultaneous button presses to cause a designated action associated with (e.g., mapped to) the particular Hall Effect sensor combination to be performed.

The designated action may comprise inputting a designated input character or command, which may vary depending on the active application (if any) and context-sensitive information. The designated action may further comprise outputting a result to an output device, such as the display 112, such as the input character or visual representation associated with the command. The context-sensitive information may include, but is not limited to, device state, currently displayed information and/or any currently selected information when the gesture was sensed, among other factors. The processor 102 may send a notification that the gesture has occurred to the operating system 146 or active application 148 in response to the input event. The operating system 146 or active application 148 may then determine the appropriate input or output in correspondence with the gesture.

Alternatively, rather than determining whether the output voltage exceeds a threshold value to identify actuations of the Hall Effect sensors 122, several threshold values may be used by the comparator circuit or processor 102. The each threshold value corresponds to a different magnetic flux density which, in turn, corresponds to varying degrees of pressure applied to the flexible skin 310. The comparator circuit may send a distinct interrupt to the processor 102 when a particular threshold value is exceeded using a number of distinct interrupt ports. The processor 102 uses the particular interrupt to determine which threshold has exceeded and the particular Hall Effect sensor 122 which was exceeded.

The comparator circuit may also send the output voltage to the ADC which converts the analog values of the Hall Effect sensors to digital values and outputs the digital values to the processor 102 for further analysis and processing. The different thresholds may be used for indexed variable input for variable input schemes such as scrolling. The particular threshold which is exceeded may be used to select an indexed variable input such as a scrolling speed.

Alternatively, the comparator circuit may be omitted and the output voltages of the Hall Effect sensors 122 may be sent directly to the ADC which converts the analog values of the Hall Effect sensors 122 to digital values and outputs the digital values to the processor 102 which performs the threshold comparison.

Alternatively, the output voltages of the Hall Effect sensors 122 may be sent directly to the ADC which converts the analog values of the Hall Effect sensors 122 to digital values and outputs the digital values to the processor 102 which performs further analysis without regard to threshold values. The raw magnetic flux density sensed by the Hall Effect sensors 122 is received by the processor 102 as input and may be used, for example, for proportional variable input. The particular threshold which is exceeded may be used to select a proportional variable input such as a scrolling speed.

Figure 8:
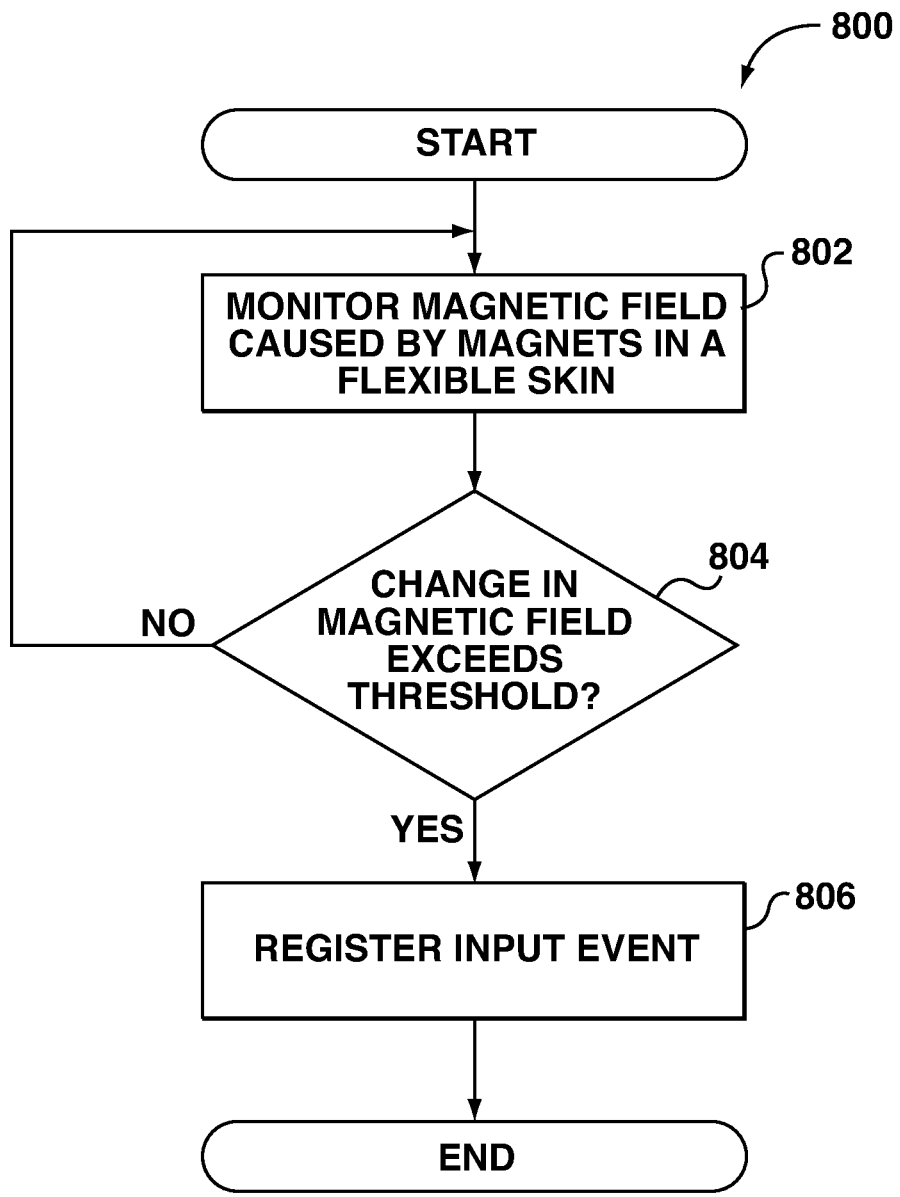
FIG. 8 is a flowchart illustrating an example method for input handling on an electronic device in accordance with one example embodiment of the present disclosure.

A flowchart illustrating one example embodiment of a method 800 for input handling on an electronic device is shown in FIG. 8. The method may be performed on the portable electronic device of FIGS. 5 and 6 or similarly equipped electronic device. The method 800 may be carried out, at least in part, by software executed by the processor 102. Coding of software for carrying out such a method 800 is within the scope of a person of ordinary skill in the art provided the present disclosure. The method 800 may contain additional or fewer processes than shown and/or described, and may be performed in a different order. Computer-readable code executable by at least one processor 102 of the portable electronic device 100 to perform the method 800 may be stored in a computer-readable medium such as the memory 110.

The processor 102 monitors a magnetic field caused by one or more magnets in a flexible skin 310 of the electronic device using one or more magnetic sensors 122 such as a Hall Effect sensor (802) as described above.

The processor 102 determines changes in the magnetic field and identifies when a magnetic sensor 122 is actuated. A magnetic sensor 122 is actuated when the magnetic field detected by the magnetic sensor 122 exceeds a threshold value (804). The processor 102 interprets a change in the magnetic field which exceeds the threshold value, i.e., actuation of a magnetic sensor 122, as an input event and registers the input event accordingly (806).

The processor 102 then causes an appropriate action to be taken in correspondence with the particular magnetic sensor 122 to be performed in response to actuation of a magnetic sensor (i.e., the input event). The action may comprise an input action and/or output action. The processor 102, in response to detecting a gesture, causes a designated action to be performed. The designated action may comprise inputting a designated input character or command, which may vary depending on the active application (if any) and context-sensitive information. The designated action may further comprise outputting a result to an output device, such as the display 112, such as the input character or visual representation associated with the command.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from its spirit or essential characteristics. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A portable electronic device, comprising:
   a processor;
   a rigid case including a rigid upper body and a rigid lower body;
   an elastomeric hinge connecting the rigid upper body and the rigid lower body, wherein the elastomeric hinge permits rotational, stretching, bending and twisting movement of the rigid lower body and the rigid upper body relative to each other;
   a plurality of magnets embedded in the elastomeric hinge such that the elastomeric hinge permits movement of the magnet in three dimensions relative to the rigid case in response to deformation of the elastomeric hinge by rotating, stretching, bending and twisting;
   a plurality of magnetic sensors carried by the rigid case in the rigid lower body and the rigid upper body and connected to the processor, each magnet sensor being adapted to sense a magnetic field generated by the magnets;
   wherein the processor is configured for:
      identifying a change in the magnetic field which matches one of the at least one predetermined gesture recognition criterion associated with deformation of the elastomeric hinge, the predetermined gesture recognition criterion including a change in the magnetic field corresponding to movement of the magnet relative to the rigid housing, the movement of the magnet corresponding to a stretch gesture, a bend gesture, a twist gesture or a positional gesture; and
      registering an input event in response to the identifying.

2. The portable electronic device of claim 1 wherein the rigid upper body includes a display connected to the processor and the rigid lower body includes a keyboard connected to the processor.

3. The portable electronic device of claim 1 wherein the elastomeric hinge permits rotational movement of the rigid lower body and the rigid upper body relative to each other about the elastomeric hinge within a range between a fully opened position and a fully closed position.

4. The portable electronic device of claim 1 wherein the elastomeric hinge permits stretching movement of the rigid lower body and the rigid upper body relative to each other between at least a fully opened position and an extended position relative to the fully opened position.

5. The portable electronic device of claim 1 wherein the elastomeric hinge permits bending movement of the rigid lower body and the rigid upper body relative to each other between at least a fully opened position and a rotated position relative to the fully opened position.

6. The portable electronic device of claim 1 wherein the plurality of magnets and plurality of magnetic sensors are located in a common plane.

7. The portable electronic device of claim 6 wherein each magnetic sensor is adapted to sense the magnetic field generated by a particular magnet or magnets in the plurality of magnets.

8. The portable electronic device of claim 7 wherein each magnetic sensor is adapted to sense the particular magnet or magnets in the plurality of magnets by appropriate selection of the shape, orientation and/or polarity of the particular magnet or magnets.

9. The portable electronic device of claim 7 wherein each magnetic sensor is a Hall Effect sensor.

10. The portable electronic device of claim 1 wherein the elastomeric skin is formed from one of urethane, neoprene or silicone rubber.

11. A portable electronic device, comprising:
    a processor;
    a fixed-body rigid case which carries the processor, the rigid case having a front, back, top, bottom and left side and right side;
    a display connected to the processor and located in the front of the rigid case;
    a keyboard connected to the processor and located in the front of the rigid case;
    a removable elastomeric skin which covers the back, top, bottom, left side and right side of the fixed-body rigid case and exposes the front of the rigid case and the display and keyboard located therein, wherein the elastomeric skin is resiliently compressible so that it is locally compresses from a reference state to a compressed state in response to a compressive force, and wherein the elastomeric skin returns from the compressed state to the reference state unaided when the compressive force is removed due to the elasticity of the elastomeric skin;
    a plurality of magnets embedded within the elastomeric skin so as to move in response to changes between the reference state and the compressed state caused by squeezing of the elastomeric skin;
    a plurality of magnetic sensors carried by the fixed-body rigid case along the left and right sides and connected to the processor, each magnet sensor being adapted to sense the magnetic field generated by one or more magnets in the plurality of magnets;
    wherein the processor is configured for:
       identifying a change in the magnetic field which matches one of the at least one predetermined gesture recognition criterion associated with deformation of the elastomeric skin, the predetermined gesture recognition criterion including a change in the magnetic field corresponding to a directional movement of the magnet, the directional movement of the magnet corresponding to a squeeze gesture or a positional gesture; and registering an input event in response to the identifying.

12. The portable electronic device of claim 11 wherein the plurality of magnets and plurality of magnetic sensors are located in a common plane.

13. The portable electronic device of claim 11 wherein the elastomeric skin is formed from one of urethane, neoprene or silicone rubber.

14. The portable electronic device of claim 11 wherein the magnets are of different sizes.

15. The portable electronic device of claim 11 wherein the magnets are of different magnetic strengths.

16. A method for gesture recognition on a portable electronic device, the method comprising:

detecting by a magnetic sensor carried by a rigid case of the portable electronic device a magnetic field of a magnet embedded in an elastomeric hinge connecting the rigid upper body and the rigid lower body, wherein the elastomeric hinge permits rotational, stretching, bending and twisting movement of the rigid lower body and the rigid upper body relative to each other, wherein the elastomeric hinge permits movement of the magnet in three dimensions relative to the rigid case in response to deformation of the elastomeric hinge by rotating, stretching, bending and twisting;

identifying by a processor of the portable electronic device a change in the magnetic field which matches a predetermined gesture recognition criterion associated with deformation of the elastomeric hinge, the predetermined gesture recognition criterion including a change in the magnetic field corresponding to movement of the magnet relative to the rigid housing, the movement of the magnet corresponding to a stretch gesture, a bend gesture, a twist gesture or a positional gesture; and registering an input event in response to the identifying.

17. The method of claim 16 wherein the identifying comprises:

determining a directional vector representing the change in the magnetic field;

determining whether the determined directional vector matches a predetermined directional vector representing a gesture;

identifying the gesture when the determined directional vector matches the predetermined directional vector.

18. The method of claim 16 wherein the predetermined criterion is the magnetic field exceeding a threshold value.

19. A method for gesture recognition on a portable electronic device, comprising:

detecting by a magnetic sensor carried by a fixed-body rigid case of the portable electronic device a magnetic field of a magnet embedded in a removable elastomeric skin, wherein the rigid case has a front, back, top, bottom and left side and right side, and wherein the removable elastomeric skin covers the back, top, bottom, left side and right side of the fixed-body rigid case and exposes the front of the rigid case and a display and QWERTY keyboard located therein, wherein the elastomeric skin is resiliently compressible so that it is locally compresses from a reference state to a compressed state in response to a compressive force, and wherein the elastomeric skin returns from the compressed state to the reference state unaided when the compressive force is removed due to the elasticity of the elastomeric skin, wherein a plurality of magnets are embedded within the elastomeric skin so as to move in response to changes between the reference state and the compressed state caused by squeezing of the elastomeric skin;

identifying by a processor of the portable electronic device:

a change in the magnetic field which matches a predetermined gesture recognition criterion associated with deformation of the elastomeric skin, the predetermined gesture recognition criterion including a change in the magnetic field corresponding to a directional movement of the magnet, the directional movement of the magnet corresponding to a squeeze gesture or a positional gesture; and registering an input event in response to the identifying.

* * * * *